Figure 1:
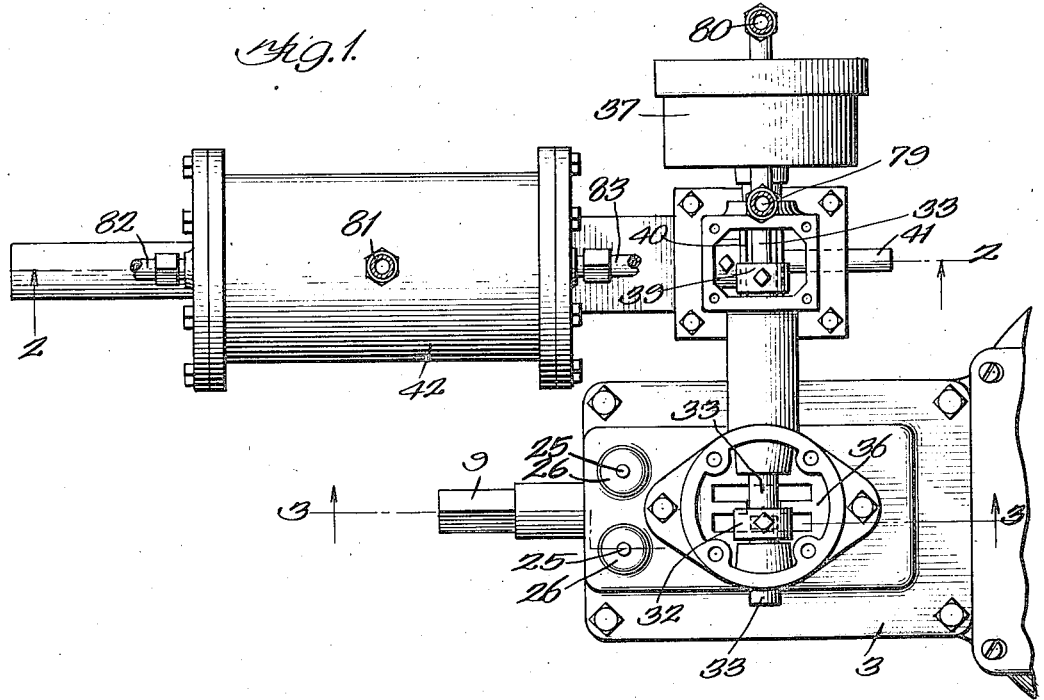

May 27, 1924.

R. R. TEETOR
POWER PLANT
Filed April 16, 1921    6 Sheets-Sheet 1

1,495,274

Inventor:
Ralph R. Teetor
By G. L. Grogg
Atty.

May 27, 1924.

R. R. TEETOR

POWER PLANT

Filed April 16, 1921  6 Sheets-Sheet 2

1,495,274

Inventor:
Ralph R. Teetor
By G. A. Gragg
Atty

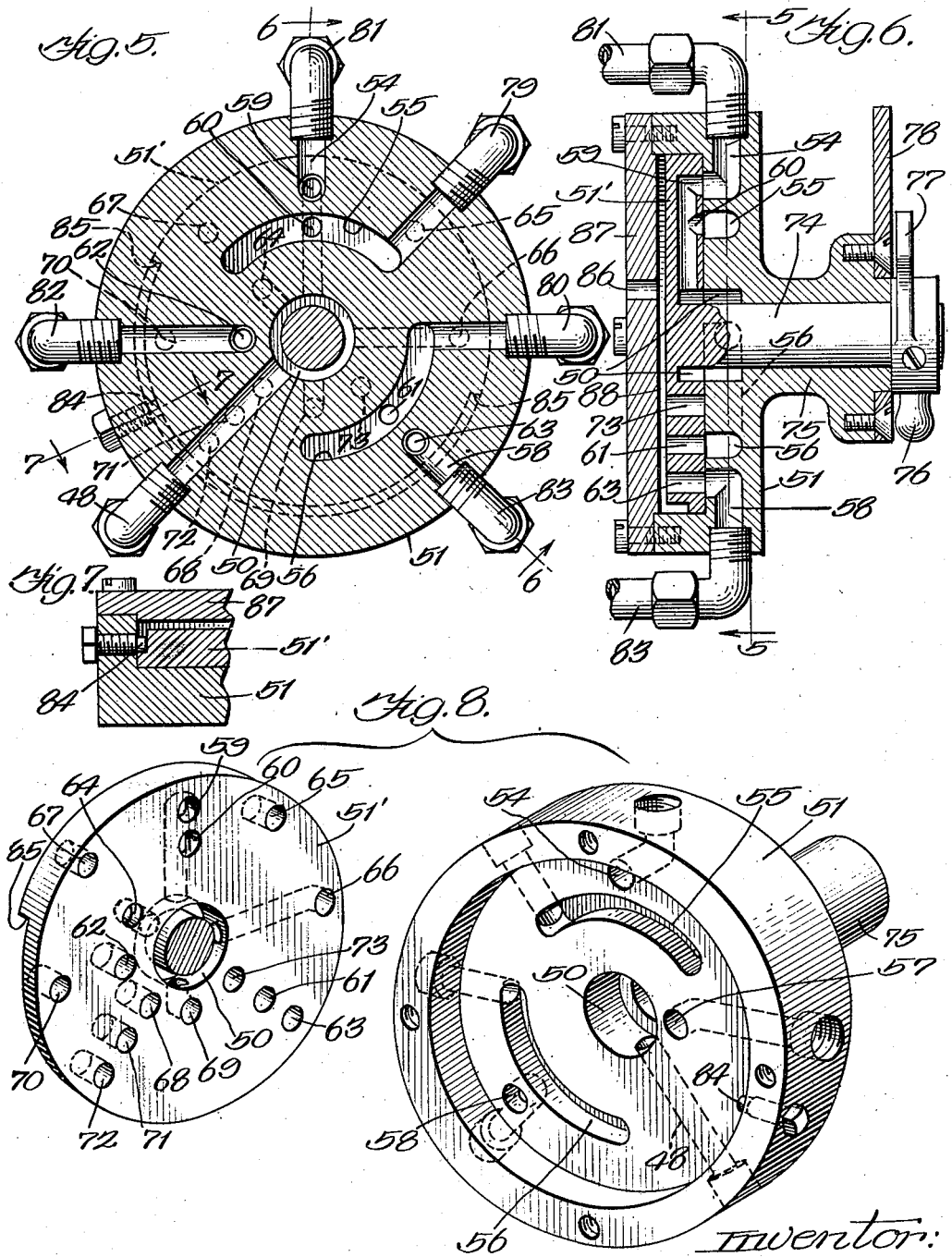

May 27, 1924.
R. R. TEETOR
POWER PLANT
Filed April 16, 1921    6 Sheets-Sheet 4
1,495,274
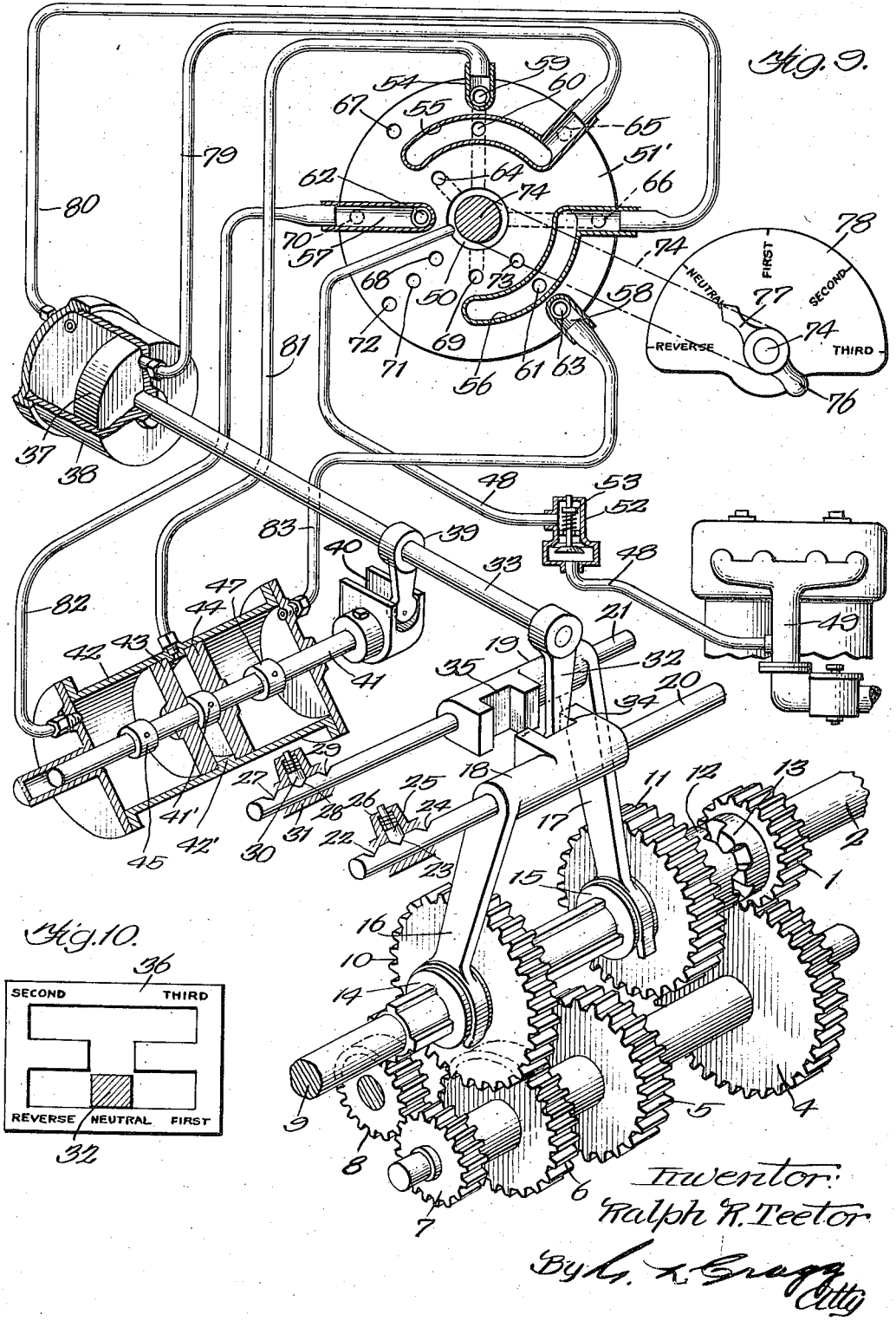

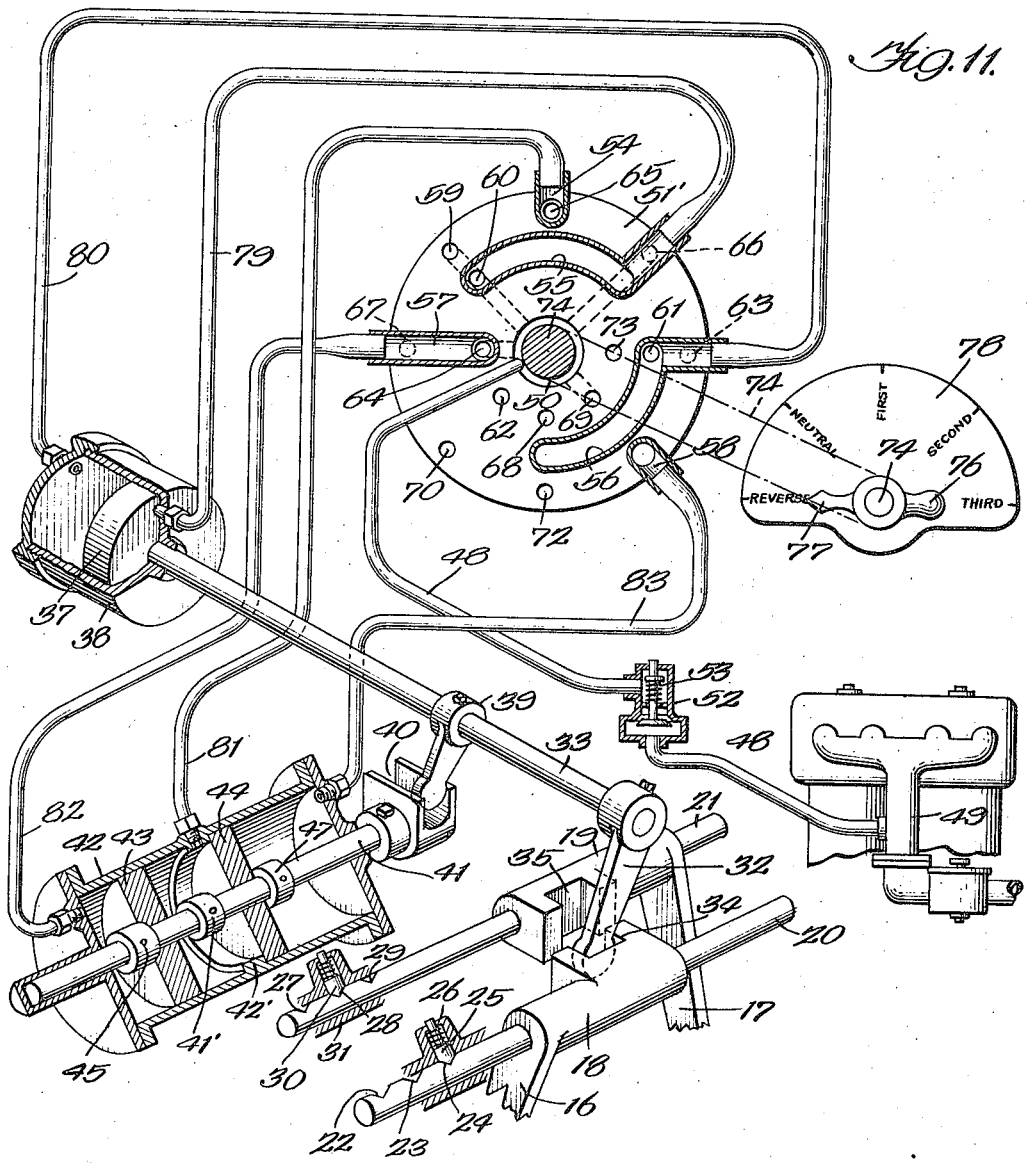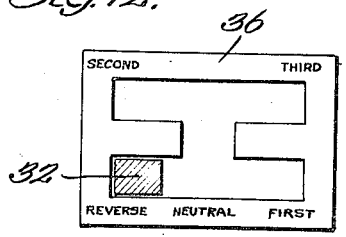

May 27, 1924.
R. R. TEETOR
POWER PLANT
Filed April 16, 1921  6 Sheets-Sheet 6
1,495,274
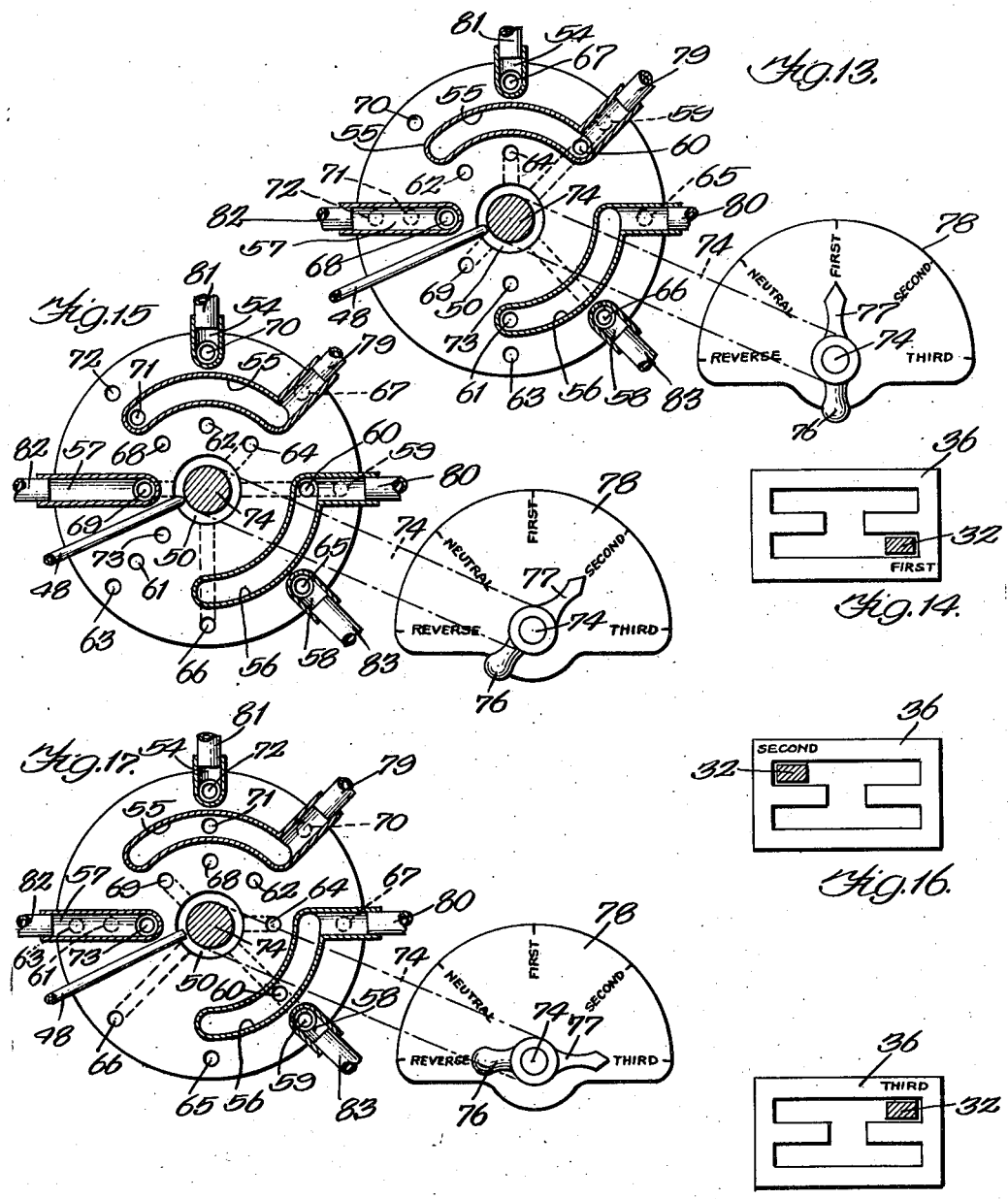

Patented May 27, 1924.

1,495,274

UNITED STATES PATENT OFFICE.

RALPH R. TEETOR, OF HAGERSTOWN, INDIANA.

POWER PLANT.

Application filed April 16, 1921. Serial No. 461,769.

*To all whom it may concern:*

Be it known that I, RALPH R. TEETOR, a citizen of the United States, residing at Hagerstown, in the county of Wayne and State of Indiana, have invented a certain new and useful Improvement in Power Plants, of which the following is a full, clear, concise, and exact description.

My invention relates to gear shifting mechanism and is of particular utility when employed in connection with speed changing and direction reversing gearing commonly used in coupling internal combustion engines of automobiles or other automotive power plants with driving vehicle wheels or other propelling devices. Mechanism of the class to which my invention relates employs a gear shift lever adjustable to swing in either of two planes of movement. In one of its planes of movement the gear shift lever is adapted so to adjust the gearing that the internal combustion engine or other motor may drive its load in normal or forward direction either at the first or lowest speed or in a reverse direction at a predetermined speed. In the other of its planes of movement the gear shift lever is adapted so to adjust the gearing that the internal combustion engine may drive its load in normal or forward direction either at the second or intermediate speed or at the highest or engine speed. The gearing which is controlled by the gear shift lever to secure the various relations of the engine or motor with its load may be of well known type and constitutes no novel part of the apparatus of my invention.

I employ mechanism for automatically moving the gear shift lever in either of its planes of movement and for moving the gear shift lever from one of its planes of movement to the other. This automatic mechanism preferably employs actuating fluid directed to devices that are so coupled with the gear shift lever as to effect the required adjustment and operations thereof.

In the preferred embodiment of the invention the fluid employed is atmospheric air whose pressure is preferably made effective by means of suction that is created by the engine, there being a suction pipe desirably connected with the intake manifold of the engine. In the preferred arrangement there is one cylinder and a single piston therein that is so coupled with the gear shift lever as to determine the plane of movement thereof and there is another cylinder with two relatively movable floating pistons therein, one adapted to move the gear shift lever in a clockwise direction and the other adapted to move the gear shift lever in a counter-clockwise direction, there being ports for permitting either of these pistons to float when the other is to function.

Figure 2:
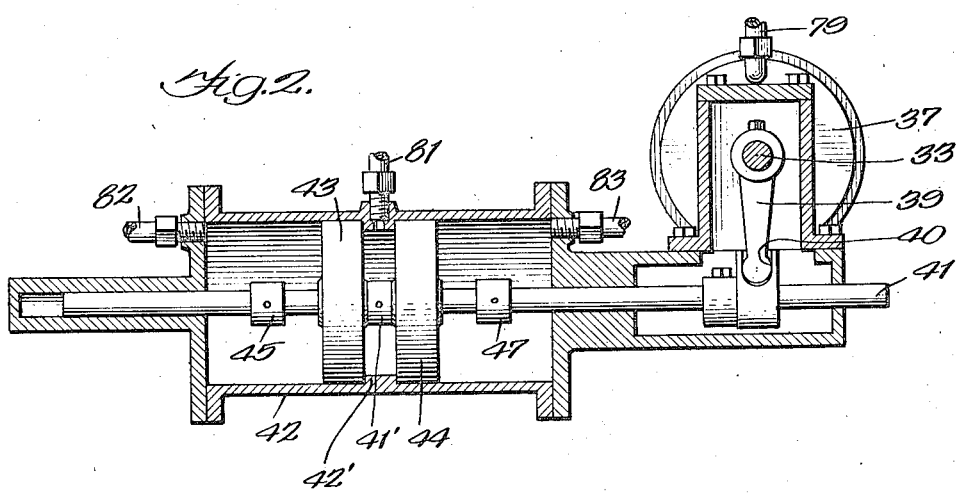
Figure 3:
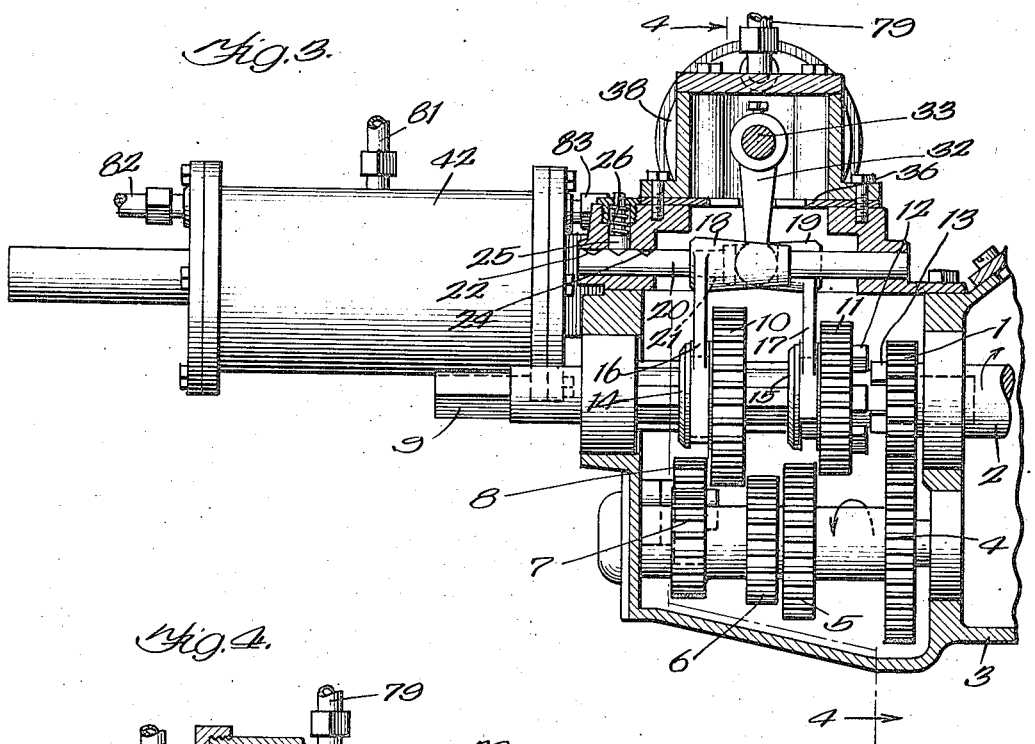
Figure 4:
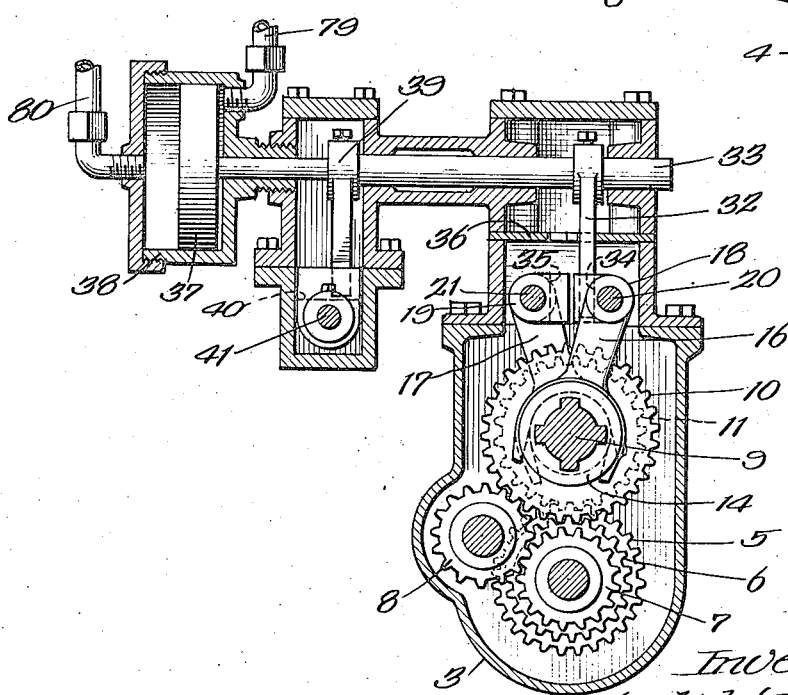

I will explain my invention more fully by reference to the accompanying drawings showing the preferred embodiment thereof and in which Fig. 1 is a plan view of a portion of a power plant equipped with the gear shifting mechanism of my invention; Fig. 2 is a sectional view on line 2—2 of Fig. 1; Fig. 3 is a sectional view on line 3—3 of Fig. 1; Fig. 4 is a sectional view on line 4—4 of Fig. 3; Fig. 5 is a sectional view on line 5—5 of Fig. 6; Fig. 6 is a sectional view on line 6—6 of Fig. 5; Fig. 7 is a sectional view on line 7—7 of Fig. 5; Fig. 8 is a perspective view illustrating component parts of the valving mechanism in separated relation; Fig. 9 is a diagrammatic view illustrating the neutral adjustment of the gearing and the condition of the mechanism that effects such adjustment; Fig. 10 shows the usual H-shaped guide structure for restricting the directions of movement of the gear shift lever and the position of the gear shift lever with respect thereto that obtains when the apparatus is adjusted as illustrated in Fig. 9; Fig. 11 is a diagrammatic view illustrating the condition of the apparatus when the gearing is adjusted for "reverse"; Fig. 12 indicates the position of the gear shift lever with respect to the H-guide when the apparatus is adjusted as illustrated in Fig. 11; Fig. 13 is a diagrammatic view illustrating the condition of a portion of the apparatus when the gearing is adjusted for first speed forward; Fig. 14 indicates the position of the gear shift lever with respect to the H-guide when the apparatus is adjusted as illustrated in Fig. 13; Fig. 15 is a diagrammatic illustrating the condition of a portion of the apparatus when the gearing is adjusted for second speed forward; Fig. 16 indicates the position of the gear shift lever with respect to the H-guide when the apparatus is adjusted as illustrated in Fig. 15; Fig. 17 is a diagrammatic view illustrating the condition of a portion of the apparatus when the gearing is adjusted for third speed forward; and Fig. 18 indicates the position of the gear shift lever with respect to the H-guide when the apparatus is adjusted as illustrated in Fig. 17.

Like parts are indicated by similar characters of reference throughout the different figures.

I have illustrated a well known form of speed changing and travel or direction reversing power transmission gearing together with the appropriate gear shifting lever and the H-guide formation that so constrains the movement of this lever as to prevent the improper action thereof in regulating the gearing.

Referring particularly to Figs. 1, 3 and 4, the gearing illustrated includes a gear wheel 1 fixed directly upon the main engine shaft 2 that usually is a part of an internal combustion hydro-carbon engine whose casing is illustrated at 3. The gear wheel 1 is in constant meshing engagement with another gear wheel 4 which is in fixed relation with gear wheels 5, 6 and 7 that are co-axial therewith. Gear wheel 7 is in constant meshing engagement with another gear wheel 8. When the engine is in operation all of the gears 1, 4, 5, 6, 7 and 8 are in rotation, these gears being of different diameters. A supplemental engine shaft 9 is aligned with the main engine shaft 2. This shaft is desirably splined and carries two gears 10 and 11 which rotate therewith but are longitudinally movable thereon and with reference to each other. The diameters of all of the gears are such as to enable the engine to operate its load at selected speeds in the forward or normal direction and at desired speed in a reverse direction. When the gear 10 is shifted into engagement with gear 6 the engine will drive its load at first speed forward. When the gear 10 is shifted into meshing engagement with gear 5 the engine will drive its load at second speed forward. When the gear 11 has been shifted into fixed connection with the gear 1 that is co-axial therewith (as for example by means of the clutch members 12 and 13 respectively fixed upon the gears 11 and 1) the engine will drive its load at full speed. When the gear 10 has been shifted into meshing engagement with the gear 8 the engine will operate its load at suitable speed in a reverse direction.

The gears 10 and 11, of different diameters, are adjustable independently of and with respect to each other longitudinally of the shaft 9. To this end these gears are provided with annular grooves in their hub portions 14 and 15 that respectively receive the forked ends of lever arms 16 and 17. These lever arms are respectively provided with sleeves 18 and 19 which surround and are fixed upon slide rods 20 and 21. The rod 20 has three notches 22, 23, 24 corresponding respectively with the first speed, neutral, and reverse positions of the gear 10 and being adapted to be held in any of these positions by a spring pressed plunger 25 mounted in a guiding sleeve 26. Rod 21 also has three notches 27, 28 and 29 corresponding respectively with the third speed, neutral and second speed positions of the gear 11 and being adapted to be held in any of these positions by a spring pressed plunger 30 stationarily mounted in a guiding sleeve 31.

The gear shift lever 32 is mounted upon the outer end of a lever rod 33 which is longitudinally movable to engage the lever 32 in the notch 34 or the notch 35 respectively provided in the sleeves 18 and 19. The rod 33 is also rotatable so as to shift the sleeve 18 and 19 engaged thereby and the rod 20 or 21 coupled with such sleeve. In accordance with common practice the intermediate portion of the gear shift lever 32 passes through the H-shaped space of the lever guide 36 whereby the shiftable gears 10 and 11 and the clutch member 12 are prevented from having faulty operation.

In accordance with my invention the gear shift lever 32 and its supporting rod 33 are movable longitudinally of their axis by means of a reciprocable element 37 which is preferably in the form of a piston working within a cylinder 38. This piston is preferably operated by pneumatic means that is controlled by suitable valving mechanism hereinafter more fully to be set forth. This valving mechanism connects one end or the other of the cylinder 38 with the intake manifold of the internal combustion engine whereby the piston 37 is moved toward the end of the cylinder thus connected with the engine, the remaining end of the cylinder being connected by the same valving mechanism with the external air to furnish the piston moving pressure.

In order that the gear shift lever may be swung after it has been moved longitudinally of its axis in connection with one or the other of the rods 20 or 21, I provide the rod 33 that supports such lever with an arm 39 received at its upper end within a slotted guide 40 that extends longitudinally of the rod 33, the arm 39 engaging the guide 40 in the various positions into which the arm is shifted when the rod 33 is longitudinally adjusted by the piston 37. The guide 40 is mounted upon the outer end of a rod 41 that is coaxial with the cylinder 42 in the end walls of which cylinder this rod is supported to slide longitudinally of the cylinder. Two floating pistons 43, 44 are disposed within the cylinder 42, the piston 43 being slidable upon and with respect to the rod 41 between the collars 45 and 41' which are fixed upon said rod. The piston 44 is slidable upon and with respect to the rod 41 between the collars 41' and 47, the collar 47 being also fixed upon said rod. The annular rib 42' keeps each floating piston in its half of the cylinder 42. The space between the floating pistons 43 and 44 and the spaces upon the outer sides of these pistons may be connected with the intake manifold of the engine or with the external atmosphere according to the direction in which the rod 41 is to be moved.

I have illustrated piping 48 between the intake manifold 49 of the engine and the vacuum port 50 which is formed within a valve member 51. This piping 48 desirably contains a valve structure, 52 which is normally open when the engine is operating and which is automatically closed, as by means of a spring 53, when the engine is stopped so that, under the latter circumstances, the vacuum which was created when the engine was running is not lost in so far as the cylinders 38 and 42 are concerned, whereby the adjustments obtained with the aid of the vacuum are not disturbed when the engine ceases to run.

The valve member 51, shown most clearly in Fig. 8, is provided with additional ports and passages 54, 55, 56, 57 and 58 which are diagrammatically illustrated in Figs. 9 and 11 as being in the nature of bores of individual pipes in order to render these diagrams most clear. The valving mechanism has another member 51' that is complemental to the valve member 51 and which is also provided with various ports and passages, 59, 60, 61, 62, 63, 64, 65, 66, 67, 68, 69, 70, 71, 72 and 73 adapted to be brought into registry with co-operating ports and passages in the member 51 upon relative turning movement of the valve members. In the preferred embodiment of the invention the valve member 51' is provided with a stem 74 which is journaled within a hub portion 75 of the valve member 51. Said valve stem carries an operating handle 76, and an index 77, the index sweeping over a dial plate 78 that is marked to indicate the various adjusting positions to which the valve member 51' may be brought by turning the valve stem 74.

When the valve mechanism is operated to bring the gearing in neutral adjustment the vacuum port 50 is brought in communication with port 60 that in turn communicates with the elongated port 55 that is connected with the right hand end of cylinder 38 by means of a pipe 79. The left hand end of the cylinder 38 is connected with the external atmosphere through the pipe 80, the elongated port 56 being connected with this pipe and in communication with the external air port 61. As a consequence the piston 37 is drawn by the vacuum or, more properly, is forced by atmospheric pressure to the right in the process of bringing the gear shift lever 32 to the position illustrated in Figs. 9 and 10, or if the piston 37 happens already to be in the right hand position it is forced to remain in such position. In the adjustment of the valve mechanism being described the vacuum port 50 communicates with the port 59 that, in turn, communicates with the port 54 which is connected by means of a pipe 81 to the mid portion of the cylinder 42 whereby both floating pistons 43 and 44 are brought to mid position with a space between the same which is defined by the collar 41' fixed upon the shaft 41 or defined by the fixed annular rib 42', the ends of the cylinder 42 being now connected with the external atmosphere. In accomplishing the latter result the external air port 62 is connected with the port 57 that communicates with the left hand end of the cylinder 42 through the pipe 82 while the external air port 63 communicates with the port 58 that is connected with the right hand end of the cylinder 42 through the pipe 83. When the floating pistons 43, 44 are in mid position the arm 39 is vertically positioned to vertically position the gear shift lever 32 whereby the gearing is in neutral adjustment.

To effect reversal in the direction of rotation of the engine driven shaft section 9 and the load coupled therewith, the gear shift lever is placed in the position indicated in Fig. 12 to bring the gear 10 into mesh with the gear 8. To this end the piston 37 should be forced to remain in its right hand position in the cylinder 38, the floating piston 44 should remain in its left hand position in the cylinder 42, and the floating piston 43 should be given actuating movement to the left (Fig. 11). When the valve is adjusted to bring the index 77 into alignment with the word "reverse" upon the dial plate, the pipes 79 and 80 that are connected with the cylinder 38 communicate with the same ports with which they communicated in the adjustment of Fig. 9. With reference to the pipes that pertain to cylinder 42, the pipe 81 is connected with the external atmosphere by way of the ports 54 and 65; the pipe 82 is connected with the suction pipe 48 by way of the communicating ports 57, 64 and 50; and pipe 83 happens to be sealed at its port 58 as connection with the external air is not required upon the right hand side of the floating piston 44 which is to remain in the position to which it was previously brought to secure the adjustment illustrated in Fig. 9. The piston 37 being in its previous adjustment, and the piston 43 being now moved to the left, the rod 33 is turned clockwise to shift the rod 20 to engage its notch 24 with the spring pressed plunger 23 whereby the gear shift lever is positioned as indicated in Fig. 12 to cause the engine to drive its load in a reverse direction.

To effect rotation of the engine driven load in normal or forward direction and at first speed, the index 77 is swung into alignment with the word "first" upon the dial plate 78. The piston 37 is still allowed and forced to remain in the right hand end of its cylinder 38 but the floating pistons 43 and 44 are first moved to mid position according to the operation described in connection with Fig. 9, whereafter the floating piston 44 is moved to the right to move the rod 41 to the right and thereby shift the gear shift lever 32 to the position indicated in Fig. 14. In order that the floating piston 44 may be moved to the right for this purpose, the pipe 83 is connected with the vacuum or suction pipe 48 by way of the ports 58, 66 and 50 that are now in communication; the pipe 81 is connected with the external atmosphere by way of the ports 54 and 67 that are now in communication; the pipe 82 is connected with the external atmosphere by way of the communicating ports 57 and 68 so that the floating piston 43 is incidentally or idly moved to mid cylinder position when the piston 44 is moved to the right, this movement of the floating piston 43 being permitted in order that the movement of the piston 44 may not be obstructed. When the floating piston 44 is thus moved to the right the rod 41 is turned counter-clockwise to shift the rod 20 to place its notch 22 in engagement with the plunger 25 whereby the speed changing gearing is adjusted to bring the gears 10 and 6 in meshing engagement so that the load may be driven in its normal direction at first speed.

To effect rotation of the engine driven load in normal or forward direction and at second speed the index 77 is swung into alignment with the word "second" upon the dial plate 78. The piston 37 is now to be brought to the left hand end of the cylinder 38 and the rod 33 is to be turned clockwise. To this end the pipe 80 is connected with the suction piping 48 by way of the communicating ports 56, 60 and 50, Fig. 15; the pipe 79 is connected with the external atmosphere by way of the communicating ports 55 and 71 (causing the left hand movement of the piston 37); the left hand end of cylinder 42 is connected with the suction pipe 48 by way of the communicating ports 57, 69 and 50; the mid zone of the cylinder 42 is connected with the external atmosphere by bringing the ports 54 and 70 into communication; and the pipe 83 is connected with the external atmosphere by bringing the ports 65 and 58 into communication. The floating piston 43 is now moved to the left to turn the rod 33 clockwise, the piston 44 having atmospheric pressure upon both sides thereof so as not to interfere with this movement of the piston 43. As a result of the combined movements of the pistons 37 and 43 the gear shift lever 32 is simultaneously pressed upon longitudinally of the shaft 33 and in a clockwise direction so that the gear shift lever is moved from the position indicated in Fig. 14 to the position indicated in Fig. 16. In this adjustment of the gear shift lever it is first brought to neutral position and is thereafter shifted from engagement with the rod structure 20 into engagement with the rod structure 21 within the recess 35 thereof, the gear shift lever thereafter being moved clockwise to move the rod 21 longitudinally and thereby establish engagement between the plunger 30 and the notch 29 to hold the rod in this position to maintain the gear shift lever 32 in the location shown in Fig. 16. In this adjustment of the parts the gears 11 and 5 are in mesh.

To effect rotation of the engine driven load in normal or forward direction and at third or engine speed, the index 77 is swung into alignment with the word "third" upon the dial plate 78 with the result that the gear shift lever is swung into the position illustrated in Fig. 18. An adjustment of the valving mechanism is given when the index 77 is in its new position that permits and forces the piston 37 to remain in the left hand end of the cylinder 38 but which causes the right hand movement of the floating piston 44 to move the rod 41 in a direction to turn the arm 39 counter-clockwise to bring the gear shift lever 32 to its counter-clockwise position in which the notch 27 is engaged by the plunger 28 to hold the rod 21 in the position to which it has been brought by the gear shift lever and in which position the clutch members 12 and 13 are coupled. In this adjustment of the valving mechanism, the pipe 79 is connected with the external atmosphere by way of the communicating ports 55 and 71; the pipe 80 is connected with the suction pipe 48 by way of the communicating ports 56, 60 and 50 (whereby the piston 37 is held in its left hand position); the pipe 83 is connected with the suction pipe 48 by way of the communicating ports 58, 59 and 50; the pipe 81 is connected with the external atmosphere by way of the communicating ports 54 and 72 (whereby the floating piston 44 is positively driven to the right to turn the shaft 33 counter-clockwise); and the pipe 82 is connected with the external atmosphere by way of the communicating ports 57 and 73. In the adjustment of the gearing which results the gears 10 and 11 are unmeshed and the clutch members 12 and 13 are coupled, as stated, so that the main shaft 2 and the shaft section 9 are driven at engine speed in normal or forward direction.

The valving member 51 carries an abutment screw 84 that projects within an arcuate recess 85 in the valve member 51' that turns with the index 77 whereby the valve member 51' is confined to a definite range of movement. Access to the external atmosphere is preferably afforded through the passage 86 to the casing portion 87 of the valve structure, this passage 86 communicating with a space 88 that intervenes between the casing portion 87 and the turning valve member 51'. The various external air ports 61, 62, 63, 65, 67, 68, 70, 71, 72 and 73 extend clear through the valve member 51' into communication with the space 88 and through this space with the passage 86. The remaining ports in the valve member 51' open only on the side of this valve member opposite the space 88 and do not communicate with that space. The port 50 is jointly formed in the valve members 51 and 51' for the sake of convenience.

While I prefer to employ pneumatic means for adjusting the reciprocable members 37, 43 and 44, I do not wish to be limited to such an agency for operating these members in all embodiments of the invention. While the mechanism of my invention is of particular utility when employed in connection with a vehicle propelling engine, I do not wish to be limited to the character of load to be operated by an engine in connection with which the apparatus of my invention is employed.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. In a power plant, the combination with a motor; of a load shaft; speed and direction changing gearing for coupling the motor with said load shaft; a gear shift lever mounted to turn in either of two planes of movement; a cylinder; a piston reciprocable in said cylinder and carrying said gear shift lever and serving to place said gear shift lever in either of two planes of movement; a second cylinder; two pistons reciprocable in the second cylinder and relatively to each other; a rod in actuating relation with said gear shift lever to turn it in each of its planes of movement and operable by one of the second aforesaid pistons in one direction to turn the gear shift lever in one direction and engageable by the remaining one of the second aforesaid pistons in a reverse direction to reverse the movement of the gear shift lever, each of said pistons being movable longitudinally of the rod with relation thereto, the rod having engaging formations engageable by each piston to effect the travel thereof in each direction; suction piping through which air is drawn by the motor; and valving mechanism connected with the aforesaid cylinders and said suction piping and provided with ports serving to connect the ends of both cylinders and the mid portion of the second cylinder with the external air and with the suction piping according to the adjustment of the valve mechanism, said ports being so relatively arranged that they serve to effect the operation of the aforesaid pistons required to place the gear shift lever in its proper plane of movement and to turn it in such plane.

2. In a power plant, the combination with a motor; of a load shaft; speed and direction changing gearing for coupling the motor with said load shaft; a gear shift lever mounted to turn in either of two planes of movement; a cylinder; a piston reciprocable in said cylinder and serving to place said gear shift lever in either of two planes of movement; a second cylinder; two pistons reciprocable in the second cylinder and relatively to each other, each of these two pistons being in actuating relation to the gear shift lever, one of these pistons serving to turn said lever in one direction and the other serving to turn the lever in the other direction; suction piping; and valving mechanism connected with the aforesaid cylinders and said suction piping and provided with ports serving to connect the ends of the cylinders with the external air and with the suction piping according to the adjustment of the valve mechanism.

3. In a power plant, the combination with a motor; of a load shaft; speed and direction changing gearing for coupling the motor with said load shaft; a gear shift lever mounted to turn in either of two planes of movement; a cylinder; a piston reciprocable in said cylinder and carrying said gear shift lever and serving to place said gear shift lever in either of two planes of movement; and means for exerting effective fluid pressure upon each side of said piston to change the plane of movement of the gear shift lever.

4. In a power plant, the combination with a motor; of a load shaft; speed and direction changing gearing for coupling the motor with said load shaft; a gear shift lever mounted to turn in each of two planes of movement; a cylinder; two pistons reciprocable in the cylinder and relatively to each other; a rod in actuating relation with said gear shift lever to turn it in each of its planes of movement and operable by one of the aforesaid pistons in one direction to turn the gear shift lever in one direction and engageable by the remaining one of the aforesaid pistons in a reverse direction to reverse the movement of the gear shift lever, each of said pistons being movable longitudinally of the rod with relation thereto, the rod having engaging formations engageable by each piston to effect the travel thereof in each direction; suction piping through which air is drawn by the motor; and valving mechanism connected with the cylinder and said suction piping and provided with ports serving to connect the mid portion of the cylinder with the external air and with the suction piping according to the adjustment of the valve mechanism, said ports being so relatively arranged that they serve to effect the operation of the aforesaid pistons required to place the gear shift lever in its proper plane of movement and to turn it in such plane.

5. In a power plant, the combination with a motor; of a load shaft; speed and direction changing gearing for coupling the motor with said load shaft; a gear shift lever mounted to turn in either of two planes of movement; a cylinder; two pistons reciprocable in the cylinder and relatively to each other, each of these two pistons being in actuating relation to the gear shift lever, one of these pistons serving to turn said lever in one direction and the other serving to turn the lever in the other direction; suction piping; and valving mechanism connected with the cylinder and said suction piping and provided with ports serving to connect the ends of the cylinder with the external air and with the suction piping according to the adjustment of the valve mechanism.

6. In a power plant, the combination with a motor; of a load shaft; speed and direction changing gearing for coupling the motor with said load shaft; a gear shift lever mounted to turn in either of two planes of movement; a cylinder; a piston reciprocable in said cylinder and carrying said gear shift lever and serving to place said gear shift lever in either of two planes of movement; suction piping; and valving mechanism connecting the cylinder with the suction piping and provided with ports serving to connect the ends of the cylinder with the external air and with the suction piping according to the adjustment of the valving mechanism, said ports being so relatively arranged that they serve to effect the operation of the piston in one direction or the other to place the gear shift lever in its proper plane of movement.

7. In a power plant, the combination with a motor; of a load shaft; speed and direction changing gearing for coupling the motor with said load shaft; a gear shift lever mounted to turn in either of two planes of movement; a cylinder; a piston reciprocable in said cylinder and serving to place said gear shift lever in either of two planes of movement; suction piping; and valving mechanism connecting the cylinder with the suction piping and provided with ports serving to connect the ends of the cylinder with the external air and with the suction piping according to the adjustment of the valving mechanism, said ports being so relatively arranged that they serve to effect the operation of the piston in one direction or the other to place the gear shift lever in its proper plane of movement.

8. In a power plant, the combination with a motor; of a load shaft; speed and direction changing gearing for coupling the motor with said load shaft; a gear shift lever mounted to turn in either of two planes of movement; two pistons, each in a cylinder and each in actuating relation with the gear shift lever, one for moving this lever in one direction and the other for moving this lever in the reverse direction; and mechanism for effecting fluid pressure upon the pistons.

9. In a power plant, the combination with a motor; of a load shaft; speed and direction changing gearing for coupling the motor with said load shaft; a gear shift lever mounted to turn in either of two planes of movement; and actuating mechanism for placing the gear shift lever in either plane of movement and for turning it in the selected plane of movement.

10. In a power plant, the combination with a motor; of a load shaft; speed and direction changing gearing for coupling the motor with said load shaft; a gear shift lever mounted to turn in either of two planes of movement; cylinder and piston mechanism in actuating relation with the gear shift lever for changing the plane of movement of this lever; and means for admitting fluid under pressure to said cylinder to shift the lever to the desired plane of movement.

In witness whereof, I have hereunto subscribed my name this 23rd day of March, A. D., 1921.

RALPH R. TEETOR.